Oct. 15, 1929.  O. K. LANDIS  1,732,053
CABLE FASTENING
Filed June 14, 1927
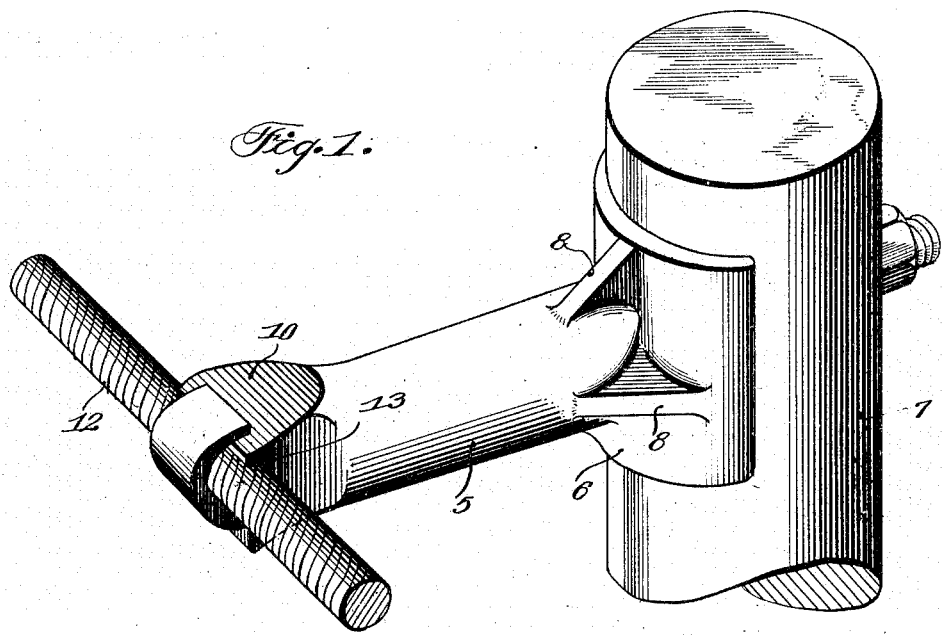
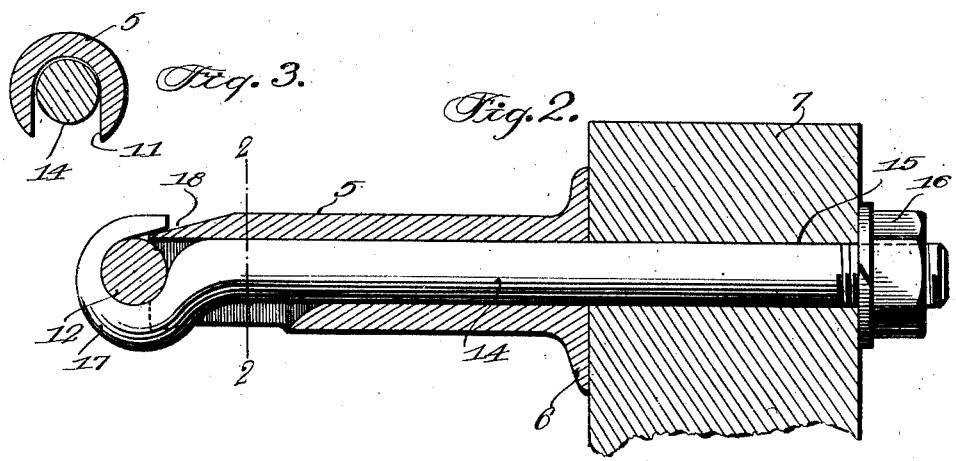
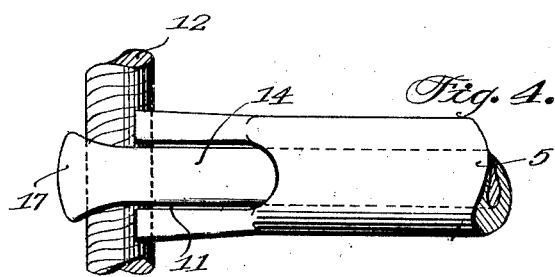
INVENTOR
OMAR K. LANDIS
BY
ATTORNEYS Patented Oct. 15, 1929

1,732,053

UNITED STATES PATENT OFFICE

OMAR K. LANDIS, OF LANCASTER, PENNSYLVANIA

CABLE FASTENING

Application filed June 14, 1927. Serial No. 198,817.

My invention relates to cable fastenings and more particularly to a device for fastening cables to posts or other suitable supports.

An object of the invention is to provide a strong and durable fastening device which will securely anchor the cable to a post and permit the former to be subjected to a maximum strain without becoming detached from its anchorage.

Further my invention contemplates a cable fastening or clamp which may be quickly attached or detached from the cable and support.

With the preceding and other objects and advantages in mind the invention consists in the combination of elements, construction and arrangement of parts, and operations to be hereinafter specifically referred to, claimed and illustrated in the accompanying drawing, wherein, Figure 1 is a perspective of my improved cable fastening associated with a cable and fence post;

Figure 2 is a vertical longitudinal sectional view of the same;

Figure 3 is a vertical transverse section taken on the line 2—2 of Figure 2, and Figure 4 is a fragmentary bottom plan view.

Referring to the invention in detail a tubular arm 5 is provided having a transversely curved base plate 6 at its inner end to embrace a cylindrical fence post 7, the tubular arm 5 and plate 6 being braced by webs or fins 8 integrally uniting these parts. While the plate 6 is illustrated and described as being curved it may be shaped to conform to the cross sectional contour of posts of various configurations.

At its outer end the arm 5 is formed with an enlarged rectangular head 10 which is cut away longitudinally or bifurcated as at 11 upon its under face from its outer end to a point rearwardly thereof. To receive a longitudinal cable 12 or other flexible element extending at right angles to the post, the outer vertical face of the head is formed with a semi-circular groove or jaw 13.

For the purpose of securing the arm 5 to the post 7 a shank 14 is provided which passes longitudinally through the arm and a registering transverse opening 15 in the post 7 with its outer end projecting beyond the post and engaged by a nut 16.

Co-operating with the jaw or groove 13 in anchoring the cable or flexible element 12 and formed upon the outer end of the shank 14 is a hook 17. This hook 17 is relatively flat, gradually decreases in thickness from its inner end to its free end and is of a width to extend over a substantial area of the head 10. As illustrated in Figure 2 the free end of the hook extends at an angle which is parallel to a bevelled surface 18 formed upon the upper face of the head 10 to permit such adjustment of the hook towards the arm as to permit the flexible element to be loosely held between the groove or jaw 13 and the hook. As the hook is located between the bifurcated parts of the head 11 the shank cannot rotate when applying or removing the nut 16.

In use the shank is drawn outwardly for a sufficient distance as to permit the engagement of the cable between the latter and outer end of the arm. The nut 16 is then threaded on the projecting end of the shank to draw the shank and hook inwardly to firmly anchor the cable between the jaw or groove 13 and the hook.

What is claimed is:—

In a fastening device, a tubular arm having a slot at one side which opens upon one end of the arm, a shank longitudinally adjustable in the arm, a hook element carried by one end of the shank and opposed to the slotted end thereof and cooperating with such end in clamping a longitudinal element therebetween, part of the hook element passing between the walls of the slot whereby the shank is held against rotation relative to the arm, and retaining means associated with the opposite end of the shank for retaining it against longitudinal movement.

OMAR K. LANDIS.